Figure 1:
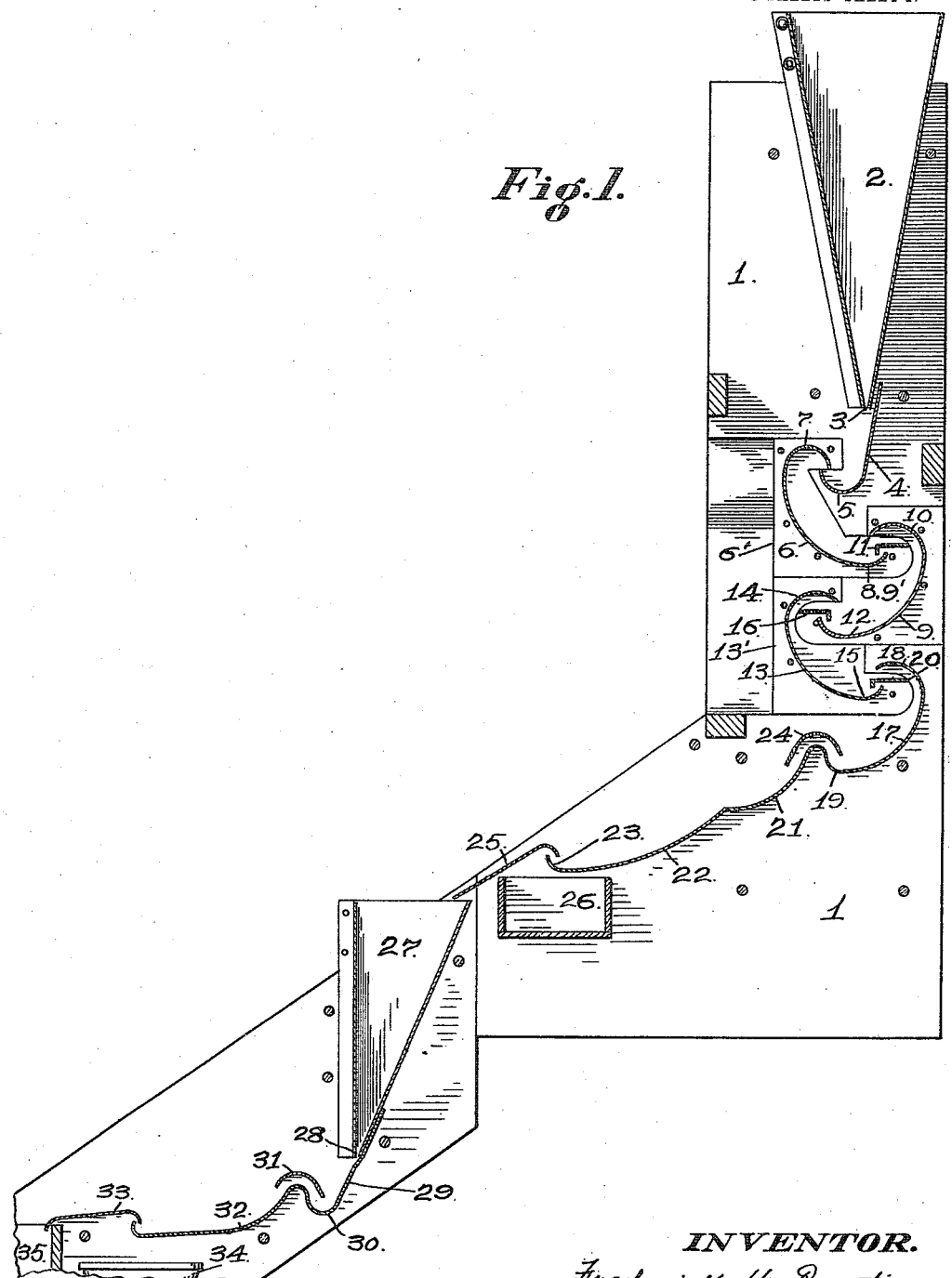

F. H. PRENTISS.
APPARATUS FOR SEPARATING PRECIOUS METALS FROM ASSOCIATED MATERIALS.
APPLICATION FILED OCT. 1, 1908.

985,447.

Patented Feb. 28, 1911.
2 SHEETS—SHEET 1.

WITNESSES.
Arthur L. Slee.
S. Constance.

INVENTOR.
Frederick H. Prentiss
by Wm. F. Booth
his Attorney.

F. H. PRENTISS.
APPARATUS FOR SEPARATING PRECIOUS METALS FROM ASSOCIATED MATERIALS.
APPLICATION FILED OCT. 1, 1908.
985,447.
Patented Feb. 28, 1911.
2 SHEETS—SHEET 2.
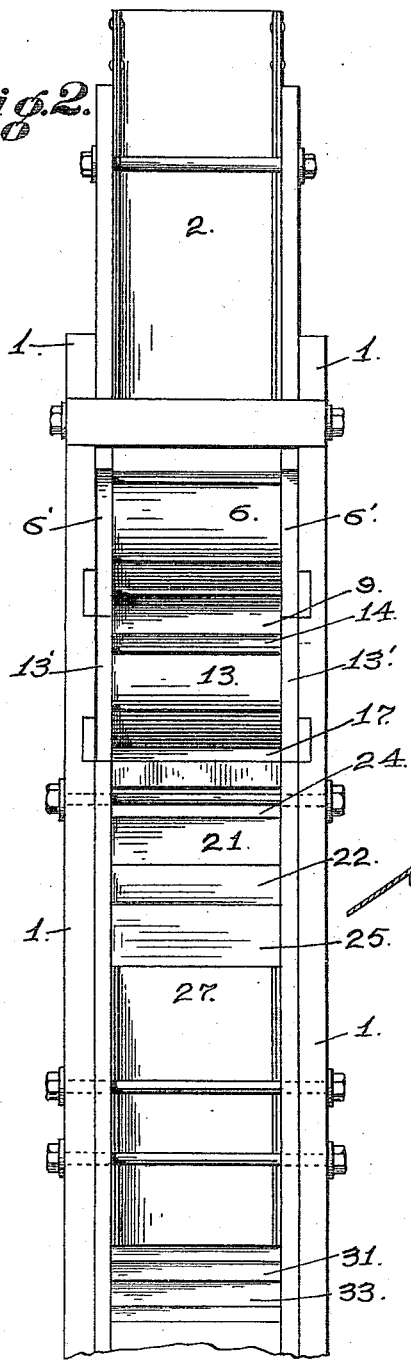
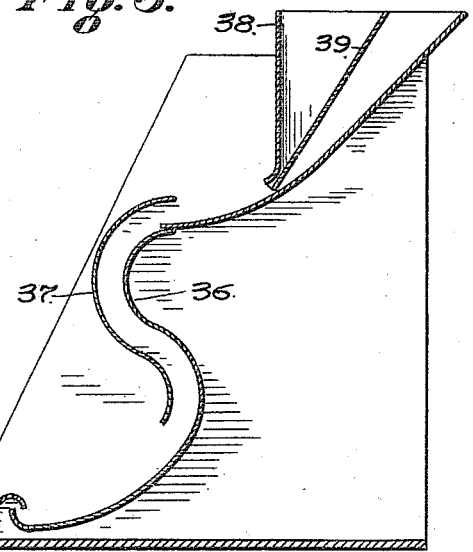
WITNESSES.
Arthur L. Slee.
S. Constine.
INVENTOR.
Frederick H. Prentiss
by Wm. F. Booth
his Attorney

UNITED STATES PATENT OFFICE.

FREDERICK H. PRENTISS, OF SAN FRANCISCO, CALIFORNIA, ASSIGNOR TO AMERICAN EXPLORATION AND GUARANTY COMPANY, OF PHOENIX, ARIZONA TERRITORY, A CORPORATION OF ARIZONA TERRITORY.

APPARATUS FOR SEPARATING PRECIOUS METALS FROM ASSOCIATED MATERIALS.

985,447.            Specification of Letters Patent.       Patented Feb. 28, 1911.
Application filed October 1, 1908. Serial No. 455,733.

*To all whom it may concern:*

Be it known that I, FREDERICK H. PRENTISS, a citizen of the United States, residing in the city and county of San Francisco and State of California, have invented certain new and useful Improvements in Apparatus for Separating Precious Metals from Associated Materials, of which the following is a specification.

My invention relates to that class of apparatus for separating precious metals from associated materials, in which the separation is due to a difference in specific gravity made available under the action of what is commonly termed "centrifugal" force.

The invention is particularly intended for the recovery of gold, platinum and other precious metals from sand or tailings; and for the separation and recovery of quick-silver from the tailings resulting from previous operations in which it was used for the separation of gold and other metals.

By my invention the separation desired is essentially effected by causing the stream of material to move in a circular path formed by a stationary plate, or a succession of such plates, with a velocity sufficient to create the centrifugal force necessary to effect the separation.

My invention, therefore, consists in the novel construction and arrangement of the apparatus to secure this result, the objects being economy and efficiency.

In the accompanying drawings, to which reference is hereby made for a full understanding of my invention,—Figure 1 is a sectional side-elevation of my apparatus. Fig. 2 is a front view of the same. Fig. 3 is a view showing schematically a modification within the scope of my invention.

1 is a frame, in the upper portion of which is a hopper 2, having a discharge opening 3.

4 is a plate, the lower portion of which is curved as shown at 5. The plate is so placed relatively to the hopper that the stream of material issuing from the discharge opening 3 strikes the plate tangentially.

6 is a second plate, having its upper portion at 7 curved on about the same radius as that of the end 5 of plate 4. The two curves are relatively reversed, and are so placed with respect to each other that the curved end 7 lies higher than the curved end 5, and the free edge of each lies within the area of the other, and is separated from it, thereby leaving an intervening space by which the concave surfaces of the two communicate. The plate 6 is so curved at its lower end as to form a trap-basin 8.

9 is a third plate, the upper curved portion 10 of which lies above and over-laps the terminal trap-basin 8 of plate 6. The plate 9 is curved in a direction reversed to plate 6 as shown. Just above the edge of the terminal trap-basin 8 of plate 6 and slightly over-lapping it, is a short cap-plate 11. The lower end of plate 9 forms a trap-basin 12.

13 is a fourth plate, having a curved upper portion 14, and a trap-basin 15 at its lower portion. This plate is set relatively to plate 9, in the same manner as plate 9 is disposed with respect to plate 6; and a short cap-plate 16 is placed between the adjacent ends of plates 9 and 13 in the same manner as the short cap-plate 11 is disposed between plates 9 and 6.

17 is a fifth plate, having a curved upper portion 18 and a trap-basin 19 at its lower portion. 20 is a third short cap-plate. These plates 17 and 20 are disposed relatively to plate 13 in the same manner as heretofore described with relation to previous plates. The plate 17 at its trap-basin 19 is succeeded by, or it may, itself, be extended, to form a curved plate 21, which is itself succeeded by a curved plate 22, the lower end of which is curved to form a trap-basin 23. Over the rising junction between plates 17 and 21 is a guard plate 24. Over-lapping and separated from the trap-basin terminal 23 of plate 22 is the final separating delivery plate 25 of this portion of the system of plates.

Under the adjacent ends of plates 22 and 25 is a tank 26, and under the delivery end of plate 25 is the tank 27. If this be assumed to be the end of the apparatus, this tank 27 will be a closed tank for the tailings. But, in case it be desired to further treat the tailings for the recovery of any precious metals or quick-silver which may still be in them, the tank 27 will assume, as I have here shown, the form of a hopper, the discharge opening 28 of which is arranged to deliver the stream of material tangentially upon a plate 29 having a curved lower portion 30, surmounted by a shield 31, and extended to form a plate 32, having at its end a separating plate 33, under which is a tank 34, and a tank 35 which may be a closed one, if we assume this to be the end; or it may be a hopper in case this portion of the system is to be repeated, which it may be, if desired, to any length necessary to effect complete separation. As far as the separation which is due to difference in specific gravity acting under centrifugal force, is concerned, all the curved plates may be of any material without regard to their surfaces; but for the full expression of my invention, the plates have their concave faces of a nature, such, for example, as copper or amalgamated surfaces, to catch the precious particles to be separated.

The operation is as follows:—The material together with water is supplied to the hopper 2, and flows in a thin stream, through the opening 3, under a head, say, for example, of twenty-four inches. It strikes tangentially the smooth concave surface of the plate 4. The twenty-four inch head will give rise to a velocity of about seven feet per second. Passing then over the curved lower portion 5 of plate 4, which portion we will assume as having a two-inch diameter, this velocity will create a centrifugal force having a value of nearly fifteen times gravity. The effect of this energy will be to force the fine particles of mercury which may be distributed through the sand into contact with the amalgamated surface of the plate, causing them to unite with the mercury coating. As soon as this mercury coating becomes thick enough, the stream of water and sand will detach from it comparatively large globules of mercury, which large globules will pass over with the stream of material to the plate 6, and be caught by the mass of mercury in the trap-basin 8 of said plate. The material delivered from the curved end 5 of plate 4 strikes the curved upper end 7 of plate 6 and following said curve, centrifugal action will again take place, the effect of which will be to force more of the finely divided particles of mercury into the amalgamated surface of the plate 6, until agglomerated masses will wash off and be caught in the trap-basin 8. The stream of sand passing over this trap will rise over the cap-plate 11, and, striking and following the curved upper portion 10 of plate 9 will once more be subjected to centrifugal action, with the result of more particles of mercury being forced into the amalgamated surface of the plate. Any excess of mercury overflowing the trap 8, will pass under the cap-plate 11 and be delivered to plate 9, and be caught in the trap 12 of said plate, as will also such agglomerated particles which wash off the surface of said plate above the trap. This operation is repeated on plates 13 and 17 down to the trap 19 of the last named plate. At this point the stream of sand and such mercury as may overflow the trap 19 pass under the guard 24, and down the extension plate 21. At the ridge which joins the plate 21 with the succeeding plate 22, the sand is projected forwardly into space and falls upon the plate 22 in a shower. The mercury particles separate from the sand and continue on down said plate 22 or are caught in its amalgamated surface. At the lower end of plate 22, the mercury forms a lake in the trap 23, and overflowing, is caught in the tank 26. The sand passes over the mercury and flows upon the delivery plate 25 down into the tank or hopper 27. This might be the end of the operation, but, in case the separation carried down to this point, is not as complete as can be desired, a repetition is provided for by making the tank 27 into a delivery hopper, as shown. The height of this tank need not be as great as that of the initial tank 2, for the velocity in this portion of the operation need not be as great, and therefore less head pressure can be used. The sand passing out from hopper 27 is delivered tangentially upon the plate 29, and some mercury is caught in the curved lower portion 30 of said plate. The sand flows under the shield 31 and is delivered to plate 32, at the lower end of which the mercury is trapped and overflows into the tank 34. The sand passes over the separating plate 33 and is delivered to the tank 35 which may be assumed to be the end. Though I have described the operation more particularly with regard to the separation and recovery of quick-silver, it is obvious that by similar action small particles of float gold and other metals will be recovered. In this whole operation it is to be noted that the apparatus is stationary, and that the rotary movement necessary to set up centrifugal action is entirely confined to the stream of water and sand; the stationary plates, by their curvature, providing a circular path which the stream of water and sand is obliged to follow. The difference between this action and that involved in the usual type of machines employing rotating baskets is noticeable from the fact that by the operation herein described the cost of the power required is very much less.

In the apparatus, as here shown, the plates 6, 9 and 13 are carried in separate drawers, designated by 6', 9' and 13'. These may be readily pulled out to afford access to the plates and to their mercury traps.

In Fig. 3, I show, somewhat schematically, a modification of the path for the stream. In this case the reverse curves are continuous, formed by the opposing plates 36 and 37. This figure also shows in the hopper 38 a partition 39. A comparatively clear stream of water may be delivered to the hopper back of the partition, while a thickened pulp of water and sand is delivered to the hopper in front of the partition. Both pulp and water are discharged against the surface of the plate below.

Having thus described my invention what I claim as new and desire to secure by Letters Patent is:—

1. In an apparatus for the described purpose, the combination of a frame; a stationary plate supported in the frame substantially upright, the lower portion of the plate being curved upwardly; and a stationary relatively deep hopper to receive a stream of sand and water, said hopper having a contracted opening at the bottom so disposed relatively to the stationary plate as to permit the discharge of a thin stream of sand and water tangentially upon the upper portion of the plate, with a velocity due to the head of water in the hopper sufficient to induce centrifugal action in the material as the stream follows the curved lower portion of the plate.

2. In an apparatus for the described purpose, the combination of a frame; a stationary plate supported in the frame substantially upright, the lower portion of the plate being curved upwardly; a stationary relatively deep hopper to receive a stream of sand and water, said hopper having a contracted opening at the bottom so disposed relatively to the stationary plate as to permit the discharge of a thin stream of sand and water tangentially upon the upper portion of the plate, with a velocity due to head of water in the hopper sufficient to induce centrifugal action in the material as the stream follows the curved lower portion of the plate; and a second, substantially upright, stationary curved plate supported in the frame, said second plate having an upper portion curved in a direction opposite to the curve of the lower portion of the first plate, the extremities of said curved portions lying each within the area of the other and separated from each other, whereby the stream from the concave surface of the first plate may pass to the concave surface of the second plate.

3. In an apparatus for the described purpose, the combination of a frame; a stationary plate supported in the frame substantially upright, the lower portion of the plate being curved upwardly; a stationary relatively deep hopper to receive a stream of sand and water, said hopper having a contracted opening at the bottom so disposed relatively to the stationary plate as to permit the discharge of a thin stream of sand and water tangentially upon the upper portion of the plate, with a velocity due to head of water in the hopper sufficient to induce centrifugal action in the material as the stream follows the curved lower portion of the plate; and a second, substantially upright, stationary curved plate supported in the frame, said second plate having an upper portion curved in a direction opposite to the curve of the lower portion of the first plate, the extremities of said curved portions lying each within the area of the other and separated from each other, whereby the stream from the concave surface of the first plate may pass to the concave surface of the second plate, said second plate having also an upwardly curved lower portion forming a trap basin for the mercury.

4. In an apparatus for the described purpose, the combination of a frame; a stationary plate supported in the frame substantially upright, the lower portion of the plate being curved upwardly; a stationary relatively deep hopper to receive a stream of sand and water, said hopper having a contracted opening at the bottom so disposed relatively to the stationary plate as to permit the discharge of a thin stream of sand and water tangentially upon the upper portion of the plate, with a velocity due to head of water in the hopper sufficient to induce centrifugal action in the material as the stream follows the curved lower portion of the plate; a second, substantially upright, stationary curved plate supported in the frame, said second plate having an upper portion curved in a direction opposite to the curve of the lower portion of the first plate, the extremities of said curved portions lying each within the area of the other and separated from each other, whereby the stream from the concave surface of the first plate may pass to the concave surface of the second plate, said second plate having also an upwardly curved lower portion forming a trap-basin for the mercury; a third, substantially upright, stationary curved plate supported in the frame, said third plate having an upper portion curved in a direction opposite to the curve of the lower portion of the second plate, the extremities of said curved portions lying each within the area of the other and separated from each other; and a stationary cap-plate lying between and separated from said curved portions.

5. In an apparatus for the described purpose, the combination of a frame; a vertically disposed succession of stationary, alternately reversed curved plates supported by said frame, the adjacent portions of said plates having their extremities lying each within the area of the other and separated from each other; a fixed cap-plate lying between and separated from said adjacent portions; and a means for supplying a thin stream of material tangentially to the first curved plate with velocity sufficient to induce centrifugal action in said material as it follows the curves of said plates.

6. In an apparatus for the described purpose, a stationary curved plate, having its terminal end shaped to form a trap-basin for the mercury; means for delivering a stream of material to the concave surface of said plate tangentially, with velocity sufficient to induce centrifugal action in the material as the stream follows said curved surface; and a cap-plate overlying and separated from the trap-basin terminal of said curved plate, disposed to form an underflow discharge for the mercury independent of the sand and water, and an overflow discharge for the sand and water independent of the mercury, whereby a separation is effected between the mercury and the sand and water.

7. In an apparatus for the described purpose, the combination of a frame; a vertically disposed succession of stationary, alternately reversed curved plates supported by said frame, the adjacent portions of said plates having their extremities lying each within the area of the other and separated from each other; a fixed cap-plate lying between and separated from said adjacent portions; means for supplying a thin stream of material tangentially to the first curved plate with velocity sufficient to induce centrifugal action in said material as it follows the curves of said plates; and other plates below said succession of curved plates, provided with means for separating and delivering separately the mercury and associated materials.

8. In an apparatus for the described purpose, a stationary curved plate; a double compartment hopper, each compartment having a narrow opening at its bottom, said openings being contiguous and so disposed relatively to the plate as to permit their discharges to join and be delivered to the concave surface of said plate tangentially, with velocity sufficient to induce centrifugal action in the stream as it follows said surface.

9. In an apparatus for the described purpose, a stationary curved plate; means for delivering a stream of material to the concave surface of said plate tangentially, with velocity sufficient to induce centrifugal action in the material as the stream follows said curved surface; and a succeeding curved plate having a cross ridge formed by a downward deflection in curvature and provided with a terminal trap basin for the mercury.

In testimony whereof I have signed my name to this specification in the presence of two subscribing witnesses.

FREDERICK H. PRENTISS.

Witnesses:
  WM. F. BOOTH,
  D. B. RICHARDS.

---

Copies of this patent may be obtained for five cents each, by addressing the "Commissioner of Patents, Washington, D. C."